US012092018B2

(12) United States Patent
Tsukiyama

(10) Patent No.: US 12,092,018 B2
(45) Date of Patent: Sep. 17, 2024

(54) MAP CREATING METHOD FOR NOZZLE VANES

(71) Applicant: TOYOTA JIDOSHA KABUSHIKI KAISHA, Aichi-ken (JP)

(72) Inventor: Takashi Tsukiyama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/447,304

(22) Filed: Aug. 10, 2023

(65) Prior Publication Data

US 2024/0068396 A1 Feb. 29, 2024

(30) Foreign Application Priority Data

Aug. 23, 2022 (JP) ................................ 2022-132312

(51) Int. Cl.
*F02B 37/22* (2006.01)
*F01D 17/16* (2006.01)

(52) U.S. Cl.
CPC ............ *F02B 37/22* (2013.01); *F01D 17/165* (2013.01)

(58) Field of Classification Search
CPC ........ F01D 17/165; F01D 17/16; F01D 17/18; F01D 17/167; F01D 9/02; F01D 9/065; F05D 2240/12; F05D 2240/128; F02B 37/22; F02B 37/24; F02B 37/025; F02B 1/104; F02D 41/0007; F02D 23/00; F01N 2560/00; F01N 2560/02; F01N 2560/025; F01N 2900/00; F01N 2900/0416; F01N 2900/14; F01N 2900/1402; Y02T 10/12; Y02T 10/40
See application file for complete search history.

(56) References Cited

U.S. PATENT DOCUMENTS 8,805,609 B2 * 8/2014 Tanaka ................ G01M 15/104 701/107
9,043,121 B2 * 5/2015 Kato ...................... F02D 41/30 701/107

(Continued)

FOREIGN PATENT DOCUMENTS

JP 2003035190 A 2/2003
JP 2009275679 A 11/2009

(Continued)

*Primary Examiner* — Mark A Laurenzi
*Assistant Examiner* — Dapinder Singh
(74) *Attorney, Agent, or Firm* — HAUPTMAN HAM, LLP

(57) ABSTRACT

A map creating method for nozzle vanes includes performing an imbalance operation as many times as the number of the cylinders while changing the specific cylinder, creating air-fuel ratio data indicating changes in the air-fuel ratio during the imbalance operation, calculating an air-fuel ratio fluctuation amount for each of pieces of the air-fuel ratio data, determining whether a specific condition is met, the specific condition being that a minimum value among the air-fuel ratio fluctuation amounts is greater than or equal to a first determination value and a difference between the minimum value and a maximum value among the air-fuel ratio fluctuation amounts is less than or equal to a second determination value, and storing, as an opening degree map, the opening degree of the nozzle vanes meeting the specific condition in association with the engine operating state.

3 Claims, 4 Drawing Sheets

(56) References Cited

U.S. PATENT DOCUMENTS

| | | | | | |
|---|---|---|---|---|---|
| 9,777,665 | B2 * | 10/2017 | Morihiro | F02D 41/0085 | |
| 10,502,151 | B2 * | 12/2019 | Kelly | F02B 37/10 | |
| 11,434,843 | B1 * | 9/2022 | Baramov | F02D 41/0007 | |
| 2010/0168986 | A1 * | 7/2010 | Iwazaki | F02D 41/0085 | 123/703 |
| 2010/0211290 | A1 * | 8/2010 | Kidokoro | F02D 41/1474 | 701/103 |

FOREIGN PATENT DOCUMENTS

| | | | |
|---|---|---|---|
| JP | 2017110549 | A | 6/2017 |
| WO | 2009141972 | A1 | 11/2009 |

* cited by examiner

MAP CREATING METHOD FOR NOZZLE VANES

RELATED APPLICATIONS

The present application claims priority of Japanese Application Number 2022-132312 filed on Aug. 23, 2022, the disclosure of which is hereby incorporated by reference herein in its entirety.

BACKGROUND

1. Field

The present disclosure relates to a map creating method for nozzle vanes.

2. Description of Related Art

Japanese Laid-Open Patent Publication No. 2003-035190 discloses an internal combustion engine and a controller therefor. The internal combustion engine includes an engine main body, a variable displacement forced-induction device, and an air-fuel ratio sensor. The engine main body includes cylinders. The forced-induction device includes a turbine wheel and nozzle vanes. The turbine wheel is located in the middle of an exhaust passage. The opening degree of the nozzle vanes can be adjusted. In addition, the flow passage area of exhaust gas flowing toward the turbine wheel changes in accordance with the opening degree of the nozzle vanes. A change in the flow passage area of the exhaust gas changes the manner in which the exhaust gas hits the turbine wheel and the manner in which the exhaust gas flows from the turbine wheel to the downstream side thereof. The air-fuel ratio sensor is located on the downstream side of the turbine wheel in the exhaust passage. The air-fuel ratio sensor detects an air-fuel ratio of exhaust gas. The controller stores an opening degree map representing a correspondence relationship between an engine operating state, which is indicated by an engine rotation speed, a fuel injection amount, and the like, and an opening degree of the nozzle vanes. The controller changes the opening degree of the nozzle vanes based on the opening degree map.

In the internal combustion engine as disclosed in Japanese Laid-Open Patent Publication No. 2003-035190, it is necessary that a sufficient amount of exhaust gas hit the air-fuel ratio sensor in order to accurately detect the air-fuel ratio by the air-fuel ratio sensor. However, the exhaust gas blow on the air-fuel ratio sensor changes depending on the shape of the flow passage from each cylinder to the nozzle vanes and the opening degree of the nozzle vanes. For this reason, in order to improve the detection accuracy of the air-fuel ratio sensor, it is necessary to set the opening degree of the nozzle vanes in consideration of the exhaust gas blow on the air-fuel ratio sensor. However, the opening degree map of the nozzle vanes disclosed in Japanese Laid-Open Patent Publication No. 2003-035190 does not take into consideration the exhaust gas blow on the air-fuel ratio sensor at all.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a map creating method for nozzle vanes creates an opening degree map of the nozzle vanes. An internal combustion engine for which the opening degree map is created includes an engine main body including cylinders, a variable displacement forced-induction device including nozzle vanes, and an air-fuel ratio sensor that is located on an exhaust downstream side of a turbine wheel of the forced-induction device and detects an air-fuel ratio of an exhaust gas. The map creating method includes: a first step of performing, under a specific engine operating state, an imbalance operation in which only an air-fuel ratio of a specific cylinder, which is one of the cylinders, is made different from air-fuel ratios of the other cylinders and combustion is sequentially performed in the cylinders, as many times as the number of the cylinders while changing the specific cylinder; a second step of obtaining a detection value of the air-fuel ratio sensor during execution of the imbalance operation to create air-fuel ratio data indicating changes in the air-fuel ratio during the imbalance operation for the number of times of execution of the imbalance operation; a third step of calculating an air-fuel ratio fluctuation amount for each piece of the air-fuel ratio data, the air-fuel ratio fluctuation amount being a difference between a maximum value and a minimum value of the air-fuel ratio in one piece of the air-fuel ratio data; and a fourth step of determining whether a specific condition is met, the specific condition being that a minimum value among the air-fuel ratio fluctuation amounts is greater than or equal to a predetermined first determination value and a difference between the minimum value and a maximum value among the air-fuel ratio fluctuation amounts is less than or equal to a predetermined second determination value. The first step to the fourth step are repeatedly performed while changing an opening degree of the nozzle vanes. The map creating method further comprises a fifth step of identifying an opening degree of the nozzle vanes that meets the specific condition under the specific engine operating state, and storing, as the opening degree map, the identified opening degree of the nozzle vanes in association with the specific engine operating state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A map creating method for nozzle vanes according to an embodiment will now be described with reference to the drawings.

<Internal Combustion Engine>

Figure 1:
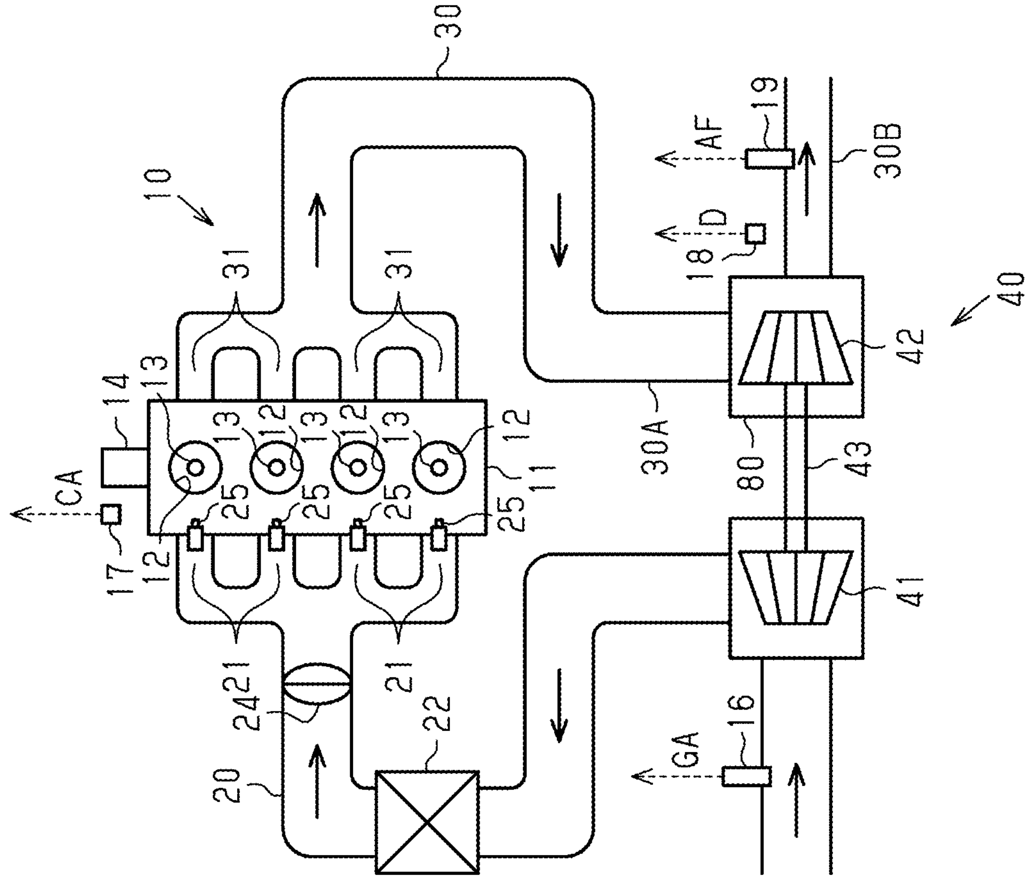
FIG. 1 is a schematic diagram showing a configuration of an internal combustion engine.

First, an internal combustion engine 10 that includes nozzle vanes 50, for which an opening degree map is created, will be described. As shown in FIG. 1, the internal combustion engine 10 includes an engine main body 11 and a crankshaft 14. The engine main body 11 includes cylinders 12. The number of cylinders 12 is four. Each cylinder 12 includes a space defined in the engine main body 11. Specifically, each cylinder 12 include a space for burning an air-fuel mixture of fuel and intake air. Although not illustrated, each cylinder 12 accommodates a piston. The piston reciprocates in the cylinder 12. The crankshaft 14 rotates in response to the reciprocating motion of the pistons. Hereinafter, when the four cylinders 12 are individually described, they are distinguished as a first cylinder #1, a second cylinder #2, a third cylinder #3, and a fourth cylinder #4.

The internal combustion engine 10 includes ignition plugs 13. The ignition plugs 13 are provided for the respective cylinders 12. The ignition plugs 13 ignite an air-fuel mixture of intake air and fuel.

The internal combustion engine 10 includes an intake passage 20, intake ports 21, an intercooler 22, a throttle valve 24, and fuel injection valves 25. The intake passage 20 conducts intake air into the cylinders 12. The intake passage 20 is connected to each cylinder 12 via an intake port 21. The intake ports 21 are provided for the respective cylinders 12. The intercooler 22 is located in the middle of the intake passage 20. The intercooler 22 cools the intake air. The throttle valve 24 is located on the downstream side of the intercooler 22 in the intake passage 20. The throttle valve 24 adjusts an intake air amount GA. The fuel injection valves 25 are provided for the respective intake ports 21. The fuel injection valves supply fuel into the cylinders 12 via the intake ports 21.

The internal combustion engine 10 includes an exhaust passage 30 and exhaust ports 31. The exhaust passage 30 is a passage for discharging exhaust gas in the cylinders 12 to the outside. The exhaust passage 30 is connected to each cylinder 12 via an exhaust port 31. The exhaust ports 31 are provided for the respective cylinders 12.

The internal combustion engine 10 includes a forced-induction device 40 that compresses intake air. The forced-induction device 40 is of a variable displacement type. The forced-induction device 40 is disposed across the intake passage 20 and the exhaust passage 30. The forced-induction device 40 includes a compressor wheel 41 and a turbine wheel 42. The compressor wheel 41 is located on the upstream side of the intercooler 22 in the intake passage 20. The turbine wheel 42 is located in the middle of the exhaust passage 30. The turbine wheel 42 is coupled to the compressor wheel 41 by a shaft 43. The turbine wheel 42 rotates in response to the flow of exhaust gas. The compressor wheel 41 rotates integrally with the turbine wheel 42. The compressor wheel 41 compresses and delivers the intake air.

The internal combustion engine 10 includes an air flow meter 16, a crank angle sensor 17, and an air-fuel ratio sensor 19. The air flow meter 16 is located on the upstream side of the compressor wheel 41 in the intake passage 20. The air flow meter 16 detects the intake air amount GA. A crank angle sensor 17 is located near the crankshaft 14. The crank angle sensor 17 detects a rotation angle (hereinafter referred to as a crank angle) CA of the crankshaft 14 in a range from 0 degrees to 720 degrees. The air-fuel ratio sensor 19 is located on the downstream side of the turbine wheel 42 in the exhaust passage 30. No other member is interposed between the air-fuel ratio sensor 19 and the turbine wheel 42, and a space exists therebetween. The air-fuel ratio sensor 19 is attached to a wall portion that defines the exhaust passage 30. The air-fuel ratio sensor 19 protrudes into the exhaust passage 30. The air-fuel ratio sensor 19 detects an air-fuel ratio AF of the exhaust gas discharged from the cylinders 12. The value of the current flowing through the air-fuel ratio sensor 19 changes in proportion to the oxygen concentration of the exhaust gas. That is, the air-fuel ratio sensor 19 detects a value proportional to the oxygen concentration of the exhaust gas. Each of the above-described sensors repeatedly outputs signals corresponding to information detected by the sensor.

<Structure Around Turbine Wheel>

Figure 2:
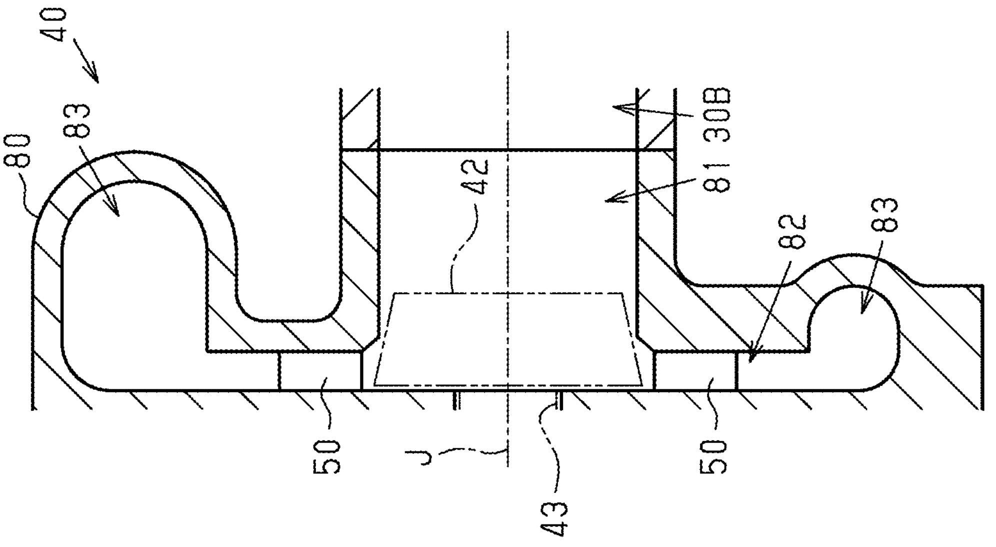
FIG. 2 is a cross-sectional view showing a structure around a turbine wheel.

The forced-induction device 40 includes a turbine housing 80. The turbine housing is located in the middle of the exhaust passage 30. As shown in FIG. 2, the turbine housing includes an outflow passage 81, an inflow passage 82, and a scroll passage 83. These three passages are defined inside the turbine housing 80 as parts of the exhaust passage 30. The outflow passage 81 has a columnar shape as a whole. The outflow passage 81 accommodates the turbine wheel 42. FIG. 2 illustrates only the outer shape of the turbine wheel 42. An outlet portion, which is one end of the outflow passage 81, is opened to the outside of the turbine housing 80. An outlet portion of the outflow passage 81 is connected to a portion 30B of the exhaust passage 30 on the downstream side of the turbine housing 80. The inflow passage 82 is annular. The inflow passage 82 surrounds the outflow passage 81 from outside. A central axis J of the inflow passage 82 coincides with a central axis J of the outflow passage 81. The inner circumferential portion of the inflow passage 82 is connected to the outflow passage 81 over the entire circumference of the inflow passage 82. The scroll passage 83 extends in a spiral shape. The scroll passage 83 surrounds the inflow passage 82 from outside. A central portion of the spiral in the scroll passage 83 is connected to the inflow passage 82. An inlet portion, which is a portion of the scroll passage 83 on the outer side of the spiral, opens to the outside of the turbine housing 80. As shown in FIG. 1, the inlet portion is connected to a portion 30A of the exhaust passage 30 on the upstream side of the turbine housing 80.

Figure 3:
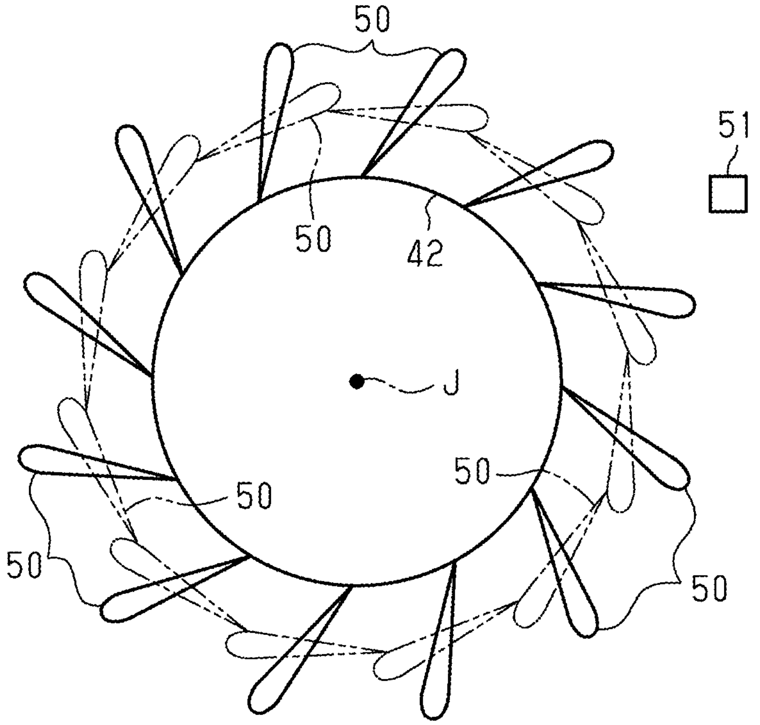
FIG. 3 is a schematic diagram showing an arrangement of nozzle vanes.

As shown in FIG. 2, the forced-induction device 40 includes nozzle vanes 50. The nozzle vanes 50 substantially have the shapes of rectangular plates. The nozzle vanes 50 are located in the inflow passage 82. As shown in FIG. 3, the nozzle vanes 50 are arranged at equal intervals over the entire circumference of the inflow passage 82. The nozzle vanes 50 surround the turbine wheel 42. The short side of the rectangle of each nozzle vane 50 extends along the central axis J of the outflow passage 81. The nozzle vanes 50 are supported to be rotatable about a central axis extending along the short sides.

The angle of each nozzle vane 50 can be changed by rotating the nozzle vane 50 about the central axis. As a result, an opening degree D of the nozzle vanes 50, which is the size of the gap between each adjacent pair of the adjacent nozzle vanes 50, is changed. As the opening degree D of the nozzle vanes 50 increases, the flow passage area of the exhaust gas flowing toward the turbine wheel 42 increases. The opening degree D of the nozzle vanes 50 is changed between 0% in a fully closed state and 100% in a fully opened state. As indicated by the long-dash double-short-dash lines in FIG. 3, the fully closed state is a state in which the nozzle vanes 50 are located at positions where the flow passage area of exhaust gas is minimized. As indicated by the solid lines in FIG. 3, the fully opened state is a state in which the nozzle vanes 50 are located at positions where the flow passage area of exhaust gas is maximized. The nozzle vanes 50 are rotated an actuator 51, which is, for example, a DC motor. As shown in FIG. 1, an opening degree sensor 18, which detects the opening degree D of the nozzle vanes 50, is disposed in the vicinity of the nozzle vanes 50.

<Map Creating System>

Figure 4:
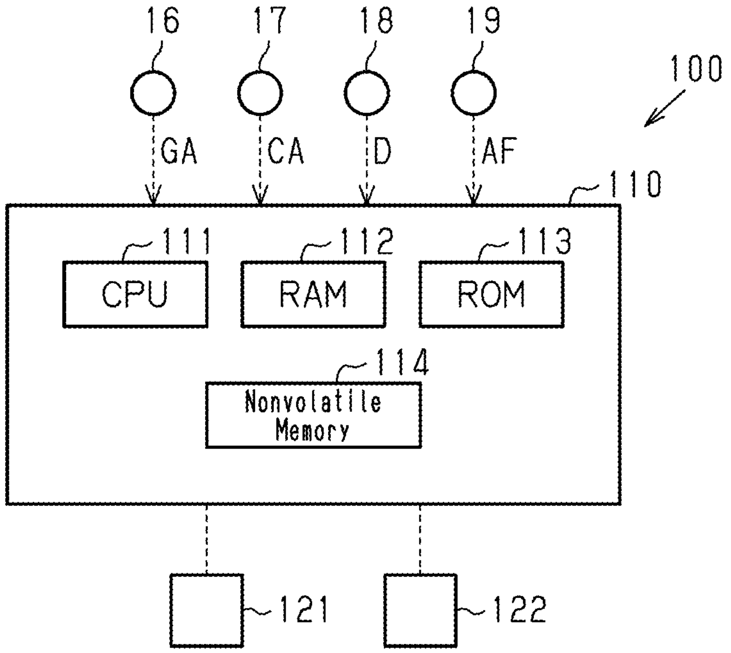
FIG. 4 is a schematic diagram showing a configuration of a map creating system.

Next, a map creating system 100 will be described. The map creating system 100 is installed in a test facility together with the internal combustion engine 10. As illustrated in FIG. 4, the map creating system 100 includes a server 110, a display device 121, and an input device 122.

The server 110 may include one or more processors that perform various processes according to computer programs (software). The server 110 may be circuitry including one or more dedicated hardware circuits such as application specific integrated circuits (ASICs) that execute at least part of various processes, or a combination thereof. The processor includes a CPU 111 and a memory such as a RAM 112 and a ROM 113. The memory stores program codes or instructions configured to cause the CPU 111 to execute processes. The memory, which is a computer-readable medium, includes any type of media that are accessible by general-purpose computers and dedicated computers. The server 110 also includes a nonvolatile memory 114, which can be electrically rewritten.

The display device 121 is connected to the server 110 in a wired or wireless manner. The display device 121 can communicate with the server 110. The display device 121 displays various kinds of information based on video signals output from the CPU 111 of the server 110. The display device 121 is, for example, a display.

The input device 122 is connected to the server 110 in a wired or wireless manner. The input device 122 can communicate with the server 110. The input device 122 is used to input information from the outside to the server 110. The input device 122 is, for example, a keyboard and a mouse.

The server 110 controls the internal combustion engine 10. The CPU 111 of the server 110 outputs various control signals to the internal combustion engine 10. The CPU 111 adjusts the opening degree of the throttle valves 24, causes the fuel injection valves 25 to inject fuel, and causes the ignition plugs 13 to perform ignition. The CPU 111 thus burns air-fuel mixture in each of the cylinders 12. Further, the CPU 111 adjusts the opening degree D of the nozzle vanes 50 through operation of the actuator 51.

The server 110 repeatedly receives detection signals from various sensors of the internal combustion engine 10. That is, the server 110 receives various detection values such as the intake air amount GA detected by the air flow meter 16, the crank angle CA detected by the crank angle sensor 17, the opening degree D of the nozzle vanes 50 detected by the opening degree sensor 18, and the air-fuel ratio AF detected by the air-fuel ratio sensor 19. The CPU 111 of the server 110 controls the internal combustion engine 10 while acquiring the state of the internal combustion engine 10 based on these detection signals. For example, the CPU 111 acquires the current engine rotation speed NE based on changes in the crank angle CA. Further, the CPU 111 acquires a current engine load factor KL based on the engine rotation speed NE and the intake air amount GA detected by the air flow meter 16. The engine load factor KL is a parameter that determines the amount of air delivered to the cylinders 12. The amount of air flowing into one cylinder 12 per cycle of the internal combustion engine 10 is referred to as an inflow air amount. The inflow air amount when the internal combustion engine 10 is in a steady operational state with the throttle valve 24 fully opened at the current engine rotation speed NE is referred to as a reference air amount. The engine load factor KL is the ratio of the current inflow air amount to the reference air amount. One cycle of the internal combustion engine 10 is a continuous period of time in which one cylinder 12 undergoes an intake stroke, a compression stroke, an expansion stroke, and an exhaust stroke, and corresponds to 720 degrees of the crank angle CA.

<Outline of Map Creating Process>

The CPU 111 of the server 110 is capable of executing a map creating process. The CPU 111 implements each process of the map creating process by executing programs stored in the ROM 113. When executing the map creating process, the CPU 111 refers to various determination values, setting values, and the like stored in the ROM 113 when necessary. Further, when executing the map creating process, the CPU 111 causes the RAM 112 to store numerical values and the like calculated in the course of executing the map creating process as necessary.

In the map creating process, the CPU 111 creates an opening degree map M of the nozzle vanes 50 (hereinafter, simply referred to as an opening degree map). The opening degree map M represents the relationship between the engine operating state and an optimum opening degree DA of the nozzle vanes 50, which is determined by taking into consideration exhaust gas blow on the air-fuel ratio sensor 19. If the opening degree D of the nozzle vanes 50 is set by a conventional map, in which the exhaust gas blow on the air-fuel ratio sensor 19 is not taken into consideration, the blow of exhaust gas from the cylinders 12 on the air-fuel ratio sensor 19 may vary. As a result, the detection accuracy of the air-fuel ratio sensor 19 may vary among the cylinders 12. The above-described optimum opening degree DA is an opening degree D that is set such that the variation among the cylinders 12 is suppressed as much as possible, and the exhaust gas blow on the air-fuel ratio sensor 19 is maximized for each cylinder 12.

The reason why the blow of exhaust gas from the cylinders 12 varies on the air-fuel ratio sensor 19 is as follows. The exhaust gas discharged from each cylinder 12 travels downstream while receiving a pressure loss in accordance with, for example, the shape of the exhaust port 31 of each cylinder 12. The shapes of the exhaust ports 31 of the cylinders 12 differ among the cylinders 12 depending on the layout of the internal combustion engine 10 and the like. Therefore, the pressure loss generated in the exhaust gas flowing through the exhaust port 31 is different for each cylinder 12. Therefore, when the amount of exhaust gas discharged from each cylinder 12 is considered individually, the amount of exhaust gas that reaches the exhaust passage 30 via the exhaust port 31, flows into the turbine housing 80, and reaches the nozzle vanes 50 differs for each cylinder 12. Although the pressure loss of the exhaust gas in accordance with the shape of the exhaust port 31 is taken as an example, there are various other reasons why the amount of the exhaust gas reaching the nozzle vanes 50 is different for each cylinder 12. Even under the condition that the opening degree D of the nozzle vanes 50 is the same, if the amount of exhaust gas passing through the nozzle vanes 50 is different for each cylinder 12, the manner in which the exhaust gas hits the turbine wheel 42 and thus the manner in which the exhaust gas flows downstream from the turbine wheel 42 are different. Along with this, the exhaust gas blow on the air-fuel ratio sensor 19 may fluctuate. As described above, the amount of exhaust gas passing through the nozzle vanes 50 differs for each cylinder 12. Therefore, the exhaust gas blow on the air-fuel ratio sensor 19 may vary among the cylinders 12. The optimum opening degree DA set by the opening degree map M is the opening degree D of the nozzle vanes 50 that minimizes such a difference.

In determining the optimum opening degree DA of the nozzle vanes 50, parameters that define the engine operating state for which the optimum opening degree DA is determined are referred to as engine parameters. In the map creating process, the CPU 111 of the server 110 uses the engine rotation speed NE and the engine load factor KL as the engine parameters. In the map creating process, the CPU 111 determines the optimum opening degree DA of the nozzle vanes 50 for various combinations of the engine rotation speed NE and the engine load factor KL. The CPU 111 repeats a first step, a second step, a third step, and a fourth step while changing the opening degree D of the nozzle vanes 50 for a specific engine operating state defined by one combination of the engine rotation speed NE and the engine load factor KL. Then, the CPU 111 finally determines the optimum opening degree DA of the nozzle vanes 50 in a fifth step. The outline of each of these steps will be described below.

In the first step, the CPU 111 performs an imbalance operation of the internal combustion engine 10. In the imbalance operation, under a specific engine operating state, only the air-fuel ratio AF of a specific cylinder, which is one of the four cylinders 12, is made different from the air-fuel ratios AF of the other cylinders, which are the remaining cylinders 12, and the air-fuel mixture is burned in order in the four cylinders 12. In the present embodiment, the CPU 111 makes the air-fuel ratio AF of the specific cylinder richer than a stoichiometric air-fuel ratio AFS. Further, the CPU 111 makes the air-fuel ratios AF of the other cylinders leaner than the stoichiometric air-fuel ratio AFS. At this time, the CPU 111 adjusts the fuel injection amount supplied to each of the cylinders 12 in consideration of the intake air amount GA that corresponds to the engine operating state. For example, the CPU 111 increases the fuel injection amount of the specific cylinder by a first ratio with respect to the fuel injection amount corresponding to the stoichiometric air-fuel ratio AFS. The first ratio is, for example, 15%. In contrast, the CPU 111 reduces the fuel injection amount of the other cylinders by a second ratio with respect to the fuel injection amount corresponding to the stoichiometric air-fuel ratio AFS. The second ratio is, for example, 5%. That is, the second ratio is one third of the first ratio. In this manner, the CPU 111 adjusts the correction amounts of the fuel injection amounts so that the mean value of the air-fuel ratios AF of the four cylinders 12 is the stoichiometric air-fuel ratio AFS. The CPU 111 performs the imbalance operation as many times as the number of the cylinders 12 while changing the specific cylinder. For each imbalance operation, only one cylinder 12 is defined as the specific cylinder. In other words, the specific cylinder is not changed during each imbalance operation. When the specific cylinder is changed, another imbalance operation is performed.

Figure 5:
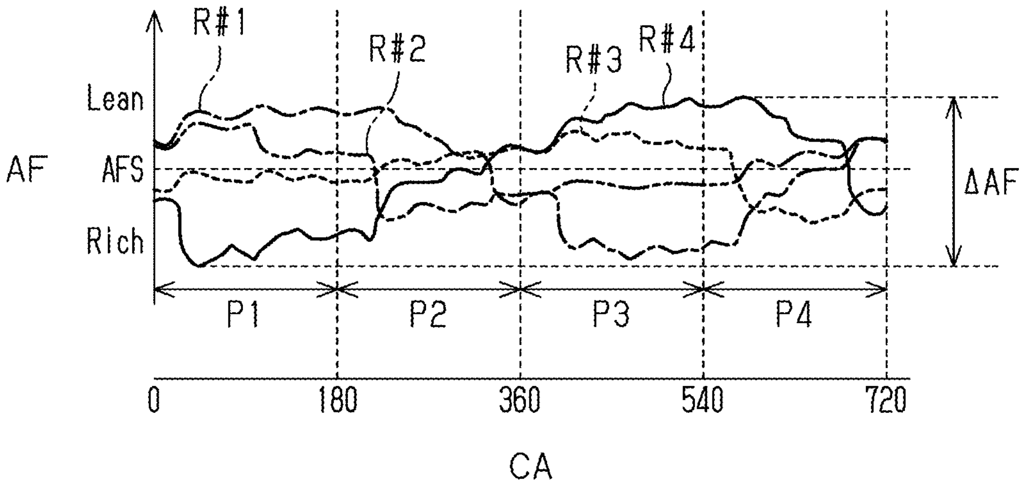
FIG. 5 is a diagram showing an example of air-fuel ratio data.

In the second step, the CPU 111 obtains the detection value of the air-fuel ratio sensor 19 during the execution of the imbalance operation, thereby creating air-fuel ratio data indicating changes in the air-fuel ratio AF during the imbalance operation. As shown in FIG. 5, one piece of the air-fuel ratio data is changes in the air-fuel ratio AF for one cycle of the internal combustion engine 10 when a certain cylinder 12 is set as the specific cylinder and the imbalance operation is performed. The CPU 111 generates four pieces of the air-fuel ratio data corresponding to the number of times of execution of the imbalance operation, i.e., the number of the cylinders 12. In the following description, when four pieces of the air-fuel ratio data are individually described, the pieces of the air-fuel ratio data are distinguished from each other in correspondence with the number assigned to the cylinder 12 set as the specific cylinder. For example, the air-fuel ratio data obtained when the first cylinder #1 is set as the specific cylinder is referred to as first air-fuel ratio data R #1.

In the third step, the CPU 111 calculates an air-fuel ratio fluctuation amount AAF for each of the four pieces of the air-fuel ratio data. As exemplified by fourth air-fuel ratio data R #4 in FIG. 5, the air-fuel ratio fluctuation amount AAF is a value obtained by subtracting the minimum value from the maximum value of the air-fuel ratio AF in the air-fuel ratio data. As will be described below in the section of operation, the air-fuel ratio fluctuation amount AAF is an index of the strength of the blow of exhaust gas from the specific cylinder on the air-fuel ratio sensor 19.

In the fourth step, the CPU 111 determines whether a specific condition is met. The specific condition is met when both of the following two items are true.

(A1) The minimum of the four air-fuel ratio fluctuation amounts AAF is greater than or equal to a first determination value K1.

(A2) A difference value, which is the value obtained by subtracting the minimum from the maximum of the four air-fuel ratio fluctuation amounts AAF, is less than or equal to a second determination value K2.

Figure 6:
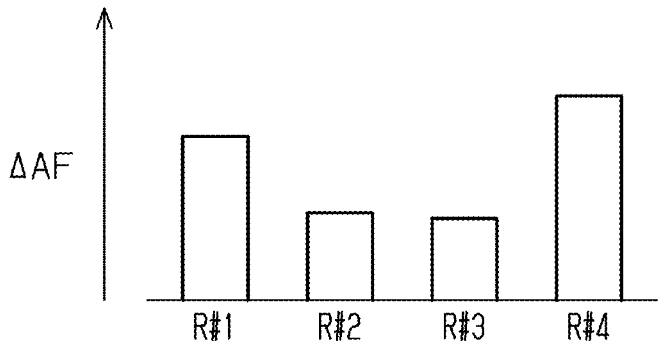
FIG. 6 is a diagram showing air-fuel ratio fluctuation amounts for each piece of the air-fuel ratio data in FIG. 5.

For example, in an example shown in FIG. 6, among the air-fuel ratio fluctuation amounts AAF of the four pieces of the air-fuel ratio data, the air-fuel ratio fluctuation amount AAF of the third air-fuel ratio data R #3 is the minimum value. Also, in the example shown in FIG. 6, among the air-fuel ratio fluctuation amounts AAF of the four pieces of the air-fuel ratio data, the air-fuel ratio fluctuation amount AAF of the fourth air-fuel ratio data R #4 is the maximum value. The CPU 111 identifies the minimum air-fuel ratio fluctuation amount AAF and the maximum air-fuel ratio fluctuation amount AAF, and determines whether the items (A1) and (A2) are true. The ROM 113 stores the first determination value K1 in advance. The first determination value K1 is determined in advance through, for example, experiments or simulations as an air-fuel ratio fluctuation amount AAF that ensures the minimum gas blow necessary for the air-fuel ratio sensor 19 to appropriately detect the exhaust gas of the specific cylinder. The ROM 113 stores the second determination value K2 in advance. The second determination value K2 is determined in advance through, for example, experiments or simulations as the maximum value of the difference value that allows variation in detection accuracy of the air-fuel ratio sensor 19 among the four cylinders 12 due to variation in the gas blow to fall within an allowable range. The term "detection accuracy" as used herein refers to how accurately the air-fuel ratio sensor 19 detects a value reflecting the actual air-fuel ratio AF of each cylinder 12, and is influenced by the strength of the exhaust gas blow on the air-fuel ratio sensor 19.

In the fifth step, the CPU 111 determines, as the optimum opening degree DA of the nozzle vanes 50, the opening degree D of the nozzle vanes 50 that meets a specific condition under a specific engine operating state. Then, the CPU 111 stores the determined optimum opening degree DA in the nonvolatile memory 114 as the opening degree map M in association with the specific engine operating state.

In the present embodiment, the CPU 111 repeats the first step to the fourth step while decreasing the opening degree D of the nozzle vanes 50 by a predetermined constant change value ΔD at a time. Then, in the fifth step, the CPU 111 determines, as the optimum opening degree DA, the largest opening degree D among the opening degrees D of the nozzle vanes 50 that meet the specific condition. The ROM 113 stores the change value ΔD in advance. The change value ΔD is determined in advance through, for example, experiments or simulations as the maximum value of a change in the opening degree D of the nozzle vanes 50 with which the blow of exhaust gas on the air-fuel ratio sensor 19 is regarded as substantially unchanged.

The CPU 111 repeats the above-described first to fifth steps while changing the combination of the engine rotation speed NE and the engine load factor KL. Thus, the CPU 111 determines the optimum opening degree DA for each of combinations of various values of the engine rotation speed NE and the engine load factor KL. The CPU 111 changes the combination of the engine rotation speed NE and the engine load factor KL for which the optimum opening degree DA is determined in the following manner. First, the CPU 111 increases the engine rotation speed NE from an initial value NE1 to a final value NE2 by a constant increase value ΔNE at a time, while fixing the engine load factor KL to an initial value KL1. After sequentially setting a series of these combinations, the CPU 111 changes the engine load factor KL from the initial value KL1 to a second value, which is greater than the initial value KL1 by a constant increase value ΔKL. Then, the CPU 111 increases the engine rotation speed NE from the initial value NE1 to the final value NE2 by the constant increase value ΔNE at a time again, while fixing the engine load factor KL to the second value. The CPU 111 sequentially changes the combination of the engine rotation speed NE and the engine load factor KL in the same manner until the engine load factor KL reaches a final value KL2. The ROM 113 stores in advance the initial value NE1, the final value NE2, and the increase value ΔNE of the engine rotation speed NE. The initial value NE1 is, for example, an idle speed. The idle speed is the minimum engine rotation speed NE at which the internal combustion engine 10 can continue to operate independently. The final value NE2 is the maximum value of the engine rotation speed NE that the internal combustion engine 10 can take, which is determined from the specifications of the internal combustion engine 10. The increase value ΔNE is the maximum value of a change in the engine rotation speed NE with which the displacement is regarded as substantially unchanged. The initial value NE1, the final value NE2, and the increase value ΔNE of the engine rotation speed NE are determined in advance through, for example, experiments or simulations. Similarly, the ROM 113 stores in advance the initial value KL1, the final value KL2, and the increase value ΔKL of the engine load factor KL. The initial value KL1 is the minimum value of the engine load factor KL that the internal combustion engine 10 can take, which is determined from the specifications of the internal combustion engine 10. The final value KL2 is the maximum value of the engine load factor KL that the internal combustion engine 10 can take, which is determined from the specifications of the internal combustion engine 10. The increase value ΔKL is the maximum value of a change in the engine load factor KL with which the displacement is regarded as substantially unchanged. The initial value KL1, the final value KL2, and the increase value ΔKL of the engine load factor KL are determined in advance through, for example, experiments or simulations.

<Specific Procedure of Map Creating Process>

Figure 7:
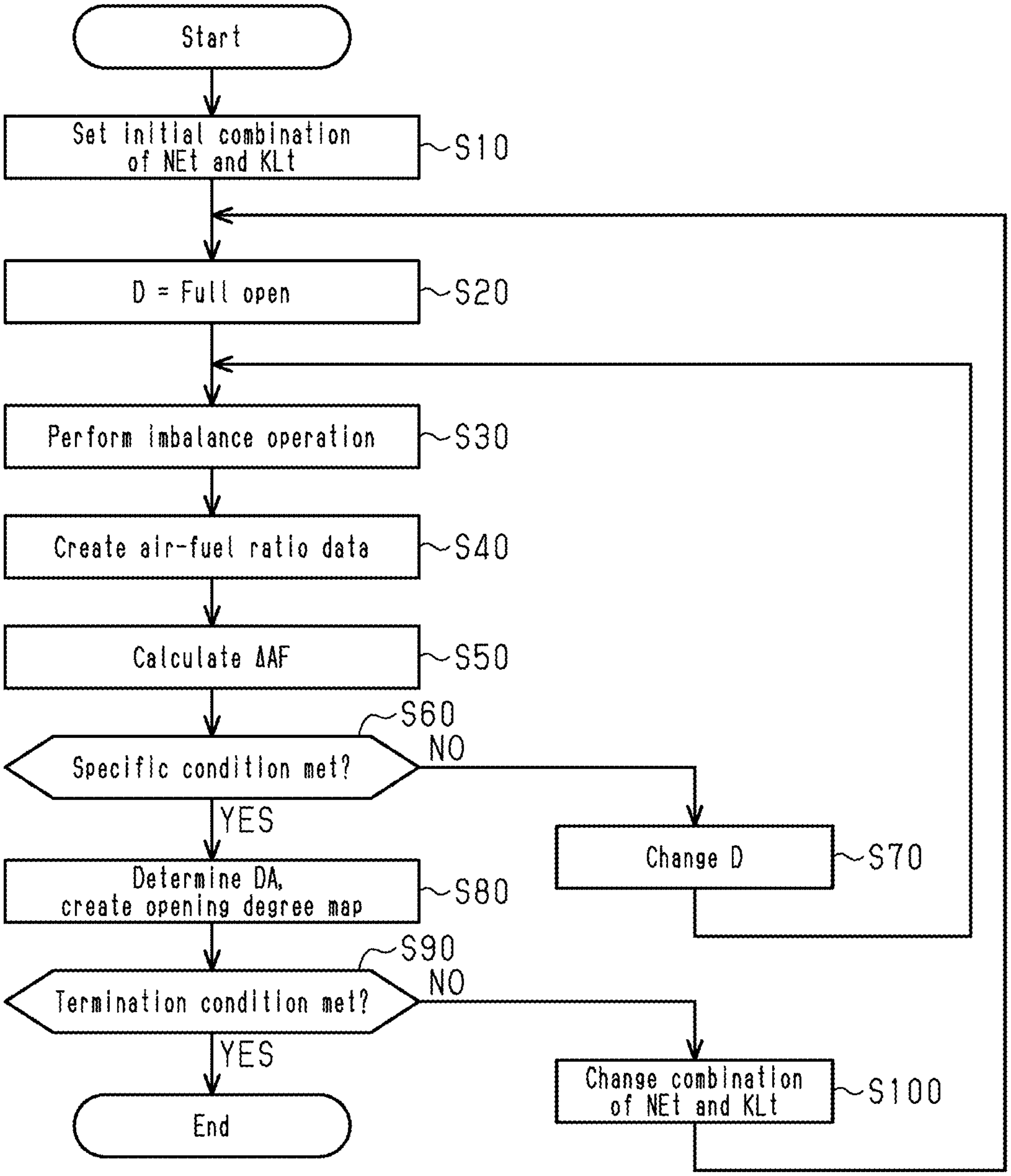
FIG. 7 is a flowchart showing a procedure of a map creating process.

The CPU 111 starts the map creating process in response to an input operation by an operator through the input device 122, for example. As shown in FIG. 7, when starting the map creating process, the CPU 111 first executes the process of step S10. In step S10, the CPU 111 sets an initial combination of the engine rotation speed NE and the engine load factor KL to determine the optimum opening degree DA of the nozzle vanes 50. Hereinafter, the engine rotation speed NE determining the optimum opening degree DA of the nozzle vanes 50 is referred to as a set rotation speed NEt. The engine load factor KL that determines the optimum opening degree DA of the nozzle vanes 50 is referred to as a set load factor KLt. In step S10, the CPU 111 sets the initial value NE1 of the engine rotation speed NE to the set engine rotation speed NEt. Further, the CPU 111 sets the initial value KL1 of the engine load factor KL to the set load factor KLt. After setting the initial combination of the set rotation speed NEt and the set load factor KLt, the CPU 111 advances the process to step S20.

In step S20, the CPU 111 maximizes the opening degree D of the nozzle vanes 50. Thereafter, the CPU 111 advances the process to step S30.

In step S30, the CPU 111 performs the imbalance operation of the internal combustion engine 10 as many times as the number of the cylinders 12 while changing the specific cylinder. Specifically, first, the CPU 111 performs a first imbalance operation. At this time, the CPU 111 defines the first cylinder #1 as the specific cylinder. The CPU 111 continues combustion of air-fuel mixture for N cycles of the internal combustion engine 10. Next, the CPU 111 performs a second imbalance operation. At this time, the CPU 111 defines the second cylinder #2 as the specific cylinder to perform the imbalance operation. The CPU 111 also continues combustion of air-fuel mixture for N cycles of the internal combustion engine 10. Similarly, the CPU 111 performs the imbalance operation in which the third cylinder #3 is defined as the specific cylinder and the imbalance operation in which the fourth cylinder #4 is defined as the specific cylinder in the order of the third cylinder #3 and the fourth cylinder #4. The CPU 111 performs the imbalance operation four times in total. During execution of these four imbalance operations, the CPU 111 controls the internal combustion engine 10 such that the engine rotation speed NE agrees with the set engine rotation speed NEt and the engine load factor KL agrees with the set load factor KLt.

The ROM 113 stores in advance the number of cycles N of the internal combustion engine 10 for which the imbalance operation is performed. The number of cycles N is determined as the following value in advance through, for example, experiments or simulations. The number of cycles N is the number of cycles required until the air-fuel ratio sensor 19 obtains a somewhat stable trend of the air-fuel ratio AF when a certain cylinder 12 is defined as the specific cylinder and the imbalance operation is performed.

In step S30, the CPU 111 performs the following operation in accordance with the execution of the imbalance operation. During execution of the imbalance operation, the CPU 111 stores, in the RAM 112, the changes in the air-fuel ratio AF received from the air-fuel ratio sensor 19 and the changes in the crank angle CA received from the crank angle sensor 17, while associating these with each other. At this time, the CPU 111 collects a group of data received during a single execution of the imbalance operation and stores the group of data in the RAM 112 as imbalance data. Therefore, during the execution of step S30, the RAM 112 stores four pieces of the imbalance data that correspond to the number of the cylinders 12. When completing the execution of the imbalance operation and the recording of the imbalance data, the CPU 111 advances the process to step S40. The process of step S30 is a first step.

In step S40, the CPU 111 creates four pieces of air-fuel ratio data as shown in FIG. 5. When creating the first air-fuel ratio data R #1, the CPU 111 reads, from the RAM 112, the imbalanced data obtained when the imbalance operation is performed with the first cylinder #1 defined as the specific cylinder. This corresponds to the CPU 111 obtaining the detection value of the air-fuel ratio sensor 19 during execution of the imbalance operation in a case in which the first cylinder #1 is defined as the specific cylinder. After reading the imbalance data, the CPU 111 extracts the changes in the air-fuel ratio AF in the last cycle. Then, the CPU 111 treats the extracted data as the first air-fuel ratio data R #1. The CPU 111 extracting the changes in the air-fuel ratio AF from the imbalance data corresponds to the CPU 111 creating air-fuel ratio data. In the same manner, the CPU 111 creates the second air-fuel ratio data R #2, the third air-fuel ratio data R #3, and the fourth air-fuel ratio data R #4. As shown in FIG. 7, the CPU 111 advances the process to step S50 after creating four pieces of air-fuel ratio data. The process of step S40 is a second step.

In step S50, the CPU 111 calculates the air-fuel ratio fluctuation amount AAF for each of the four pieces of the air-fuel ratio data. The CPU 111 identifies the maximum and minimum values of the air-fuel ratio AF for each piece of the air-fuel ratio data. Then, as shown in FIG. 6, the CPU 111 calculates the air-fuel ratio fluctuation amount AAF for each piece of the air-fuel ratio data. As shown in FIG. 7, after calculating the four air-fuel ratio fluctuation amounts AAF, the CPU 111 advances the process to step S60. The process of step S50 is a third step.

In step S60, the CPU 111 determines whether both the items (A1) and (A2) defining the specific condition are true. When determining whether the item (A1) is true, the CPU 111 first identifies the minimum value of the four air-fuel ratio fluctuation amounts AAF. In the example of FIG. 6, the CPU 111 identifies the air-fuel ratio fluctuation amount AAF of the third air-fuel ratio data R #3 as the above-mentioned minimum value. Then, the CPU 111 compares the minimum value with the first determination value K1. Accordingly, the CPU 111 determines whether the item (A1) is true. When determining whether the item (A2) is true, the CPU 111 identifies the maximum and minimum values of the four air-fuel ratio fluctuation amounts AAF. In the example of FIG. 6, the CPU 111 identifies the air-fuel ratio fluctuation amount AAF of the fourth air-fuel ratio data R #4 as the maximum value, and identifies the air-fuel ratio fluctuation amount AAF of the third air-fuel ratio data R #3 as the minimum value. Then, the CPU 111 calculates a value obtained by subtracting the minimum value from the maximum value as a difference value. Then, the CPU 111 compares the difference value with the second determination value K2. Accordingly, the CPU 111 determines whether the item (A2) is true. When determining that at least one of the items (A1) and (A2) is not true, the CPU 111 determines that the specific condition is not met (step S60: NO). In this case, as shown in FIG. 7, the CPU 111 advances the process to step S70. The process of step S60 is a fourth step.

In step S70, the CPU 111 decreases the opening degree D of the nozzle vanes 50 from the current value by the change value ΔD. When the opening degree D of the nozzle vanes 50 is changed, the CPU 111 returns to the process of step S30. Then, the CPU 111 executes the process of step S30 and the subsequent processes again.

Thereafter, the CPU 111 repeats the processes from step S30 to step S70. When both the items (A1) and (A2) are true in step S60 during repetition of these processes, the CPU 111 determines that the specific condition is met (step S60: YES). In this case, the CPU 111 advances the process to step S80.

In step S80, the CPU 111 determine the current opening degree D of the nozzle vanes 50 as the optimum opening degree DA, which corresponds to the current combination of the set rotation speed NEt and the set load factor KLt. Then, the CPU 111 associates the determined optimum opening degree DA with the current set rotation speed NEt and set load factor KLt, and stores these in the nonvolatile memory 114 as the opening degree map M. Specifically, the CPU 111 performs the following processes. As a premise, the nonvolatile memory 114 stores a provisional map in advance. The provisional map serves as a base of the opening degree map M. Specifically, the provisional map is a Cartesian coordinate system in which the engine rotation speed NE is the X-axis and the engine load factor KL is the Y-axis. The CPU 111 writes the determined optimum opening degree DA at a position corresponding to the current combination of the set rotation speed NEt and the set load factor KLt in the provisional map. At the same time, the CPU 111 stores the provisional map in which the optimum opening degree DA has been written in the nonvolatile memory 114. Each time the CPU 111 executes the process of step S80, the optimum opening degree DA is added to the provisional map. After executing the process of step S80, the CPU 111 advances the process to step S90. The process of step S80 is a fifth step.

In step S90, the CPU 111 determines whether the specification of the optimum opening degree DA has been completed for all the combinations of the engine rotation speed NE and the engine load factor KL. Specifically, the CPU 111 determines whether the following termination condition is met. The termination condition is met when both of the following two items are true.

(B1) The current set rotation speed NEt agrees with the final value NE2 of the engine rotation speed NE.

(B2) The current set load factor KLt agrees with the final value KL2 of the engine load factor KL.

When any one of the two items (B1) and (B2) is not true, the CPU 111 determines that the termination condition is not met (step S90: NO). In this case, the CPU 111 advances the process to step S100.

In step S100, the CPU 111 changes the combination of the set rotation speed NEt and the set load factor KLt. The method of changing the combination of the set rotation speed NEt and the set load factor KLt is as described above. After changing the combination of the set rotation speed NEt and the set load factor KLt, the CPU 111 returns to the process of step S20. Then, CPU 111 executes the processes of step S20 to step S80 again.

Thereafter, the CPU 111 repeatedly changes the combination of the set rotation speed NEt and the set load factor KLt, determines the optimum opening degree DA, and writes the optimum opening degree DA in the provisional map. When both the items (B1) and (B2) are true in step S90 during repetition of these processes, the CPU 111 determines that the termination condition is met. (Step S90: YES). In this case, the CPU 111 ends the series of processes of the map creating process.

When the above-described series of processes is completed, the CPU 111 completes the opening degree map M. Specifically, the CPU 111 interpolates the optimum opening degree DA between each adjacent pair of the engine rotation speeds NE in the current provisional map. The CPU 111 also interpolates the optimum opening degree DA between each adjacent pair of the engine load factors KL. The opening degree map M is thus completed. The opening degree map M of the present embodiment is a graph. The opening degree map M has the following basic characteristics, for example. At a specific engine rotation speed NE, the optimum opening degree DA increases as the engine load factor KL increases. At a specific engine load factor KL, the optimum opening degree DA increases as the engine rotation speed NE increases.

Operation of Embodiment

(A) Relationship Between Air-Fuel Ratio Fluctuation Amount and Gas Blow

As a result of various experiments and simulations, the inventor of the present application obtained the following findings. The air-fuel ratio fluctuation amount AAF is an index of the strength of the blow of exhaust gas from the specific cylinder on the air-fuel ratio sensor 19. More specifically, the larger the air-fuel ratio fluctuation amount AAF, the stronger the blow of the exhaust gas from the specific cylinder on the air-fuel ratio sensor 19. The reason why this relationship is established will be described below.

As a premise, the basic characteristics of the changes in the air-fuel ratio data will be described. During one cycle of the internal combustion engine 10, the cylinders 12 sequentially undergo the exhaust stroke. Accordingly, the changes in the air-fuel ratio data basically sequentially reflect the air-fuel ratio AF of the respective cylinders 12. For example, the changes in the fourth air-fuel ratio data R #4 in the case in which the fourth cylinder #4 is defined as the specific cylinder in FIG. 5 will now be discussed. When the fourth cylinder #4 is defined as the specific cylinder, the air-fuel ratio AF of the fourth cylinder #4 is richer than the stoichiometric air-fuel ratio AFS. On the other hand, the air-fuel ratios AF of the other three cylinders 12 are leaner than the stoichiometric air-fuel ratio AFS. Reflecting the air-fuel ratios AF of the cylinders 12, the air-fuel ratio AF is basically richer than the stoichiometric air-fuel ratio AFS in the first period P1, in which the fourth cylinder #4 is in the exhaust stroke, in the fourth air-fuel ratio data R #4. Then, in the second period P2, the third period P3, and the fourth period P4, in which the other three cylinders 12 reach the exhaust strokes, respectively, the air-fuel ratio AF becomes leaner than the stoichiometric air-fuel ratio AFS. The other pieces of air-fuel ratio data basically show the same trend. That is, in the other pieces of air-fuel ratio data as well, the air-fuel ratio AF becomes richer than the stoichiometric air-fuel ratio AFS at the time when the specific cylinder reaches the exhaust stroke, and then the air-fuel ratio AF becomes leaner than the stoichiometric air-fuel ratio AFS.

As described in relation to the outline of the map creating process, when the opening degree D of the nozzle vanes 50 is set without considering the exhaust gas blow on the air-fuel ratio sensor 19 at all, the blow of the exhaust gas from the cylinders 12 on the air-fuel ratio sensor 19 may vary. For example, in the internal combustion engine 10 of the present embodiment, the exhaust gas blow on the air-fuel ratio sensor 19 is strong with the fourth cylinder #4 and weak with the second cylinder #2. When the pieces of the air-fuel ratio data are compared with each other, the air-fuel ratio AF differs in the period in which the specific cylinder is in the exhaust stroke due to variations in the strength of the gas blow. For example, the air-fuel ratio AF is richer in the first period P1, in which the fourth cylinder #4 is in the exhaust stroke in the fourth air-fuel ratio data R #4, than in the second period P2, in which the second cylinder #2 is in the exhaust stroke in the second air-fuel ratio data R #2. This is considered to be because the stronger the gas blow on the air-fuel ratio sensor 19, the easier it is for the air-fuel ratio sensor 19 to directly detect the exhaust gas discharged from the specific cylinder. For example, when the gas blow on the air-fuel ratio sensor 19 is weak, there is a possibility that the air-fuel ratio sensor 19 will not detect the exhaust gas actually discharged by the specific cylinder, but will detect the gas remaining in the exhaust passage 30 and containing a large amount of oxygen discharged by the cylinders other than the specific cylinder. Along with this, the air-fuel ratio AF detected by the air-fuel ratio sensor 19 may be leaner. For this reason, the air-fuel ratio AF can be richer in the first period P1 of the fourth air-fuel ratio data R #4 than in the second period P2 of the second air-fuel ratio data R #2. Along with this, the minimum value of the fourth air-fuel ratio data R #4 can become smaller than the minimum value of the second air-fuel ratio data R #2. In general, the minimum value of the air-fuel ratio AF in the air-fuel ratio data may become small in the air-fuel ratio data in which the cylinder 12 in which the exhaust gas strongly blows on the air-fuel ratio sensor 19 is defined as the specific cylinder.

On the other hand, there is relatively small difference among the maximum values of the air-fuel ratios AF in the four pieces of air-fuel ratio data. In each piece of the air-fuel ratio data, the maximum value of the air-fuel ratio AF appears in a period other than the exhaust stroke of the specific cylinder. In this period, the three cylinders other than the specific cylinder sequentially discharge exhaust gas having air-fuel ratios AF leaner than the stoichiometric air-fuel ratio AFS. As a result, the exhaust passage 30 as a whole is in an environment in which the air-fuel ratio is leaner than the stoichiometric air-fuel ratio AFS. For this reason, it is predicted that the maximum values of the air-fuel ratios AF are substantially the same among the four pieces of the air-fuel ratio data. Strictly speaking, the maximum values of the air-fuel ratios AF may vary due to differences in the amount of exhaust gas from the three cylinders.

Due to the above-described characteristics, particularly, due to differences in the minimum values of the air-fuel ratios AF, the air-fuel ratio fluctuation amount AAF may become larger in the air-fuel ratio data in which a cylinder 12 of a strong gas blow on the air-fuel ratio sensor 19 is defined as the specific cylinder than in the air-fuel ratio data in which a cylinder 12 of a weak gas blow is defined as the specific cylinder. In other words, the blow of gas can be stronger with a specific cylinder of air-fuel ratio data in which the air-fuel ratio fluctuation amount AAF is large than with a specific cylinder of air-fuel ratio data in which the air-fuel ratio fluctuation amount AAF is small.

(B) Implementation of Opening Degree Map

Figure 8:
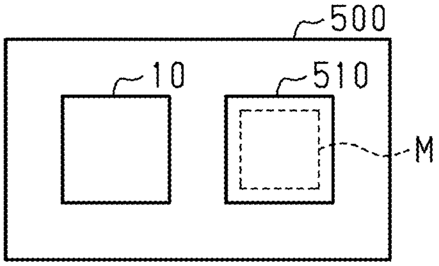
FIG. 8 is a schematic diagram of a vehicle in which an opening degree map is implemented.

An example in which the opening degree map M is implemented in a vehicle will be described. As shown in FIG. 8, a vehicle 500 is equipped with the internal combustion engine 10 having the same specification as that installed in the test facility and a controller 510 that controls the internal combustion engine 10. The controller 510 stores in advance the opening degree map M created by the map creating system 100. There may be variations in the air-fuel ratio AF among the cylinders 12 due to variations in the injection performance of the fuel injection valves 25, variations in the distribution amount of intake air, and the like. In order to acquire the degree of such variation among the cylinders 12, the controller 510 may perform variation diagnosis for diagnosing the degree of variation in the air-fuel ratio AF among the cylinders 12 during operation of the internal combustion engine 10. In the variation diagnosis, the controller 510 monitors, for example, changes in the air-fuel ratio AF detected by the air-fuel ratio sensor 19. Then, the controller 510 compares the amount of change in the air-fuel ratio AF per unit time with a reference value. Based on the result of the comparison, the controller 510 determines whether the variation in the air-fuel ratio AF among the cylinders 12 is within an allowable range. During the execution of the variation diagnosis, the controller 510 controls the opening degree D of the nozzle vanes 50 using the opening degree map M. Specifically, the controller 510 acquires the current engine operating state during execution of the variation diagnosis. Then, the controller 510 refers to the opening degree map M and determines the opening degree D of the nozzle vanes 50 that corresponds to the current engine operating state. The controller 510 operates the actuator 51 so as to achieve the opening degree D of the nozzle vanes 50. The controller 510 performs the variation diagnosis under the opening degree D of the nozzle vanes 50. If there is a variation in the detection accuracy of the air-fuel ratio sensor 19 among the cylinders 12 due to variations in blow of the exhaust gas from each cylinder 12 on the air-fuel ratio sensor 19, it is difficult to accurately acquire the air-fuel ratio AF of the air-fuel mixture of each cylinder 12. As a result, an accurate determination result may not be obtained in the variation diagnosis. In this regard, it is possible to obtain an accurate determination result by performing the variation diagnosis under the optimum opening degree DA of the nozzle vanes 50 defined in the opening degree map M.

Advantages of Embodiment (1) As described in the section of the operation of the embodiment, the air-fuel ratio fluctuation amount AAF, which is obtained by the imbalance operation, can be an index of the variations of the blow of exhaust gas from each cylinder 12 on the air-fuel ratio sensor 19. The present embodiment determines the opening degree D of the nozzle vanes 50 that satisfies the specific condition defined by the air-fuel ratio fluctuation amount AAF. It is thus possible to create a map that defines the opening degree D of the nozzle vanes 50 at which the blow the exhaust gas from each cylinder 12 on the air-fuel ratio sensor 19 becomes consistently strong.

(2) In the present embodiment, in determining the optimum opening degree DA of the nozzle vanes 50, the opening degree D of the nozzle vanes 50 is decreased gradually from the fully opened state. Accordingly, the optimum opening degree DA is determined as the largest opening degree D among the opening degrees D of the nozzle vanes 50 that meet the specific condition. The pressure of the exhaust gas acting on the nozzle vanes 50 tends to increase as the opening degree D of the nozzle vanes 50 becomes closer to the fully closed state. Therefore, in the present embodiment, the opening degree D at which the gas pressure is less likely to act on the nozzle vanes 50 is determined as the optimum opening degree DA. The determined opening degree D of the nozzle vanes 50 minimizes the load on the actuator 51, which drives the nozzle vanes 50.

(3) In the present embodiment, the optimum opening degree DA is determined for various engine operating states. It is thus possible to create the opening degree map M that can be used in various situations. When such an opening degree map M is implemented in the vehicle 500, the following is possible. That is, it is possible to always set the optimum opening degree D of the nozzle vanes 50 from the viewpoint of improving the exhaust gas blow on the air-fuel ratio sensor 19 while the engine operating state variously changes according to the traveling state of the vehicle 500.

MODIFICATIONS

The above-described embodiment may be modified as follows. The above-described embodiment and the following modifications can be combined as long as the combined modifications remain technically consistent with each other.

When the opening degree map M is created by the map creating process, the imbalance operation may be simulated by a simulation using a model, instead of actually running the internal combustion engine 10 to perform the imbalance operation. At this time, the air-fuel ratio AF estimated to be detected by the air-fuel ratio sensor 19 may be calculated by mathematical expressions. Such simulations may be employed in the first and second steps. A technique such as computational fluid dynamics (CFD) can be used to perform the simulations.

The air-fuel ratio AF set for the specific cylinder and the other cylinders in performing the imbalance operation is not limited to the example of the above-described embodiment. The air-fuel fuel ratios AF set for the specific cylinder and the other cylinders may be changed as long as only the air-fuel ratio AF of the specific cylinder is different from the air-fuel ratios AF of the other cylinders. For example, the air-fuel ratio AF of the specific cylinder may be made leaner than the stoichiometric air-fuel ratio AFS, and the air-fuel ratios AF of the other cylinders may be made richer than the stoichiometric air-fuel ratio AFS.

An oxygen sensor that detects only the presence or absence of oxygen may be employed as the air-fuel ratio sensor 19. Then, the air-fuel ratio AF may be acquired from the detection value of the oxygen sensor to create air-fuel ratio data.

In the above-described embodiment, in determining the optimum opening degree DA of the nozzle vanes 50, the opening degree D of the nozzle vanes 50 is decreased gradually from the fully opened state while repeating the first step to the fourth step. When the opening degree D of the nozzle vanes 50 meeting the specific condition is identified, that opening degree D is determined as the optimum opening degree DA. Instead of this method, even after the opening degree D of the nozzle vanes 50 meeting the specific condition is identified, the opening degree D of the nozzle vanes 50 may be continuously changed to the fully closed state while repeating the first step to the fourth step. In this case, while the opening degree D of the nozzle vanes 50 is changed from the fully opened state to the fully closed state, multiple opening degrees D of the nozzle vanes 50 that meet the specific condition may be identified. In this case, among the multiple identified opening degrees D, the opening degree D having the best condition from the viewpoint of strengthening the blow of exhaust gas from each cylinder on the air-fuel ratio sensor 19 may be determined as the optimum opening degree DA.

In determining the optimum opening degree DA of the nozzle vanes 50, the opening degree D of the nozzle vanes 50 does not necessarily need to be decreased gradually from the fully opened state. The opening degree D of the nozzle vanes 50 may be increased from the fully closed state to the fully open state.

The types and number of the engine parameters are not limited to the example in the above-described embodiment. As the engine parameters, other parameters may be employed instead of or in addition to the engine rotation speed NE and the engine load factor KL. For example, in a case in which the internal combustion engine 10 is provided with an exhaust gas recirculation passage, which recirculates exhaust gas from the exhaust passage 30 to the intake passage 20, the amount of exhaust gas recirculated to the intake passage 20 through the exhaust gas recirculation passage may be employed as an engine parameter. The exhaust gas blow on the air-fuel ratio sensor 19 is related to the amount of the exhaust gas. From this point of view, a parameter associated with the amount of exhaust gas is effective as an engine parameter. Any engine parameter can be used as long as it represents the operating state of the internal combustion engine 10 and is associated with the exhaust gas blow on the air-fuel ratio sensor 19.

The opening degree map M is not limited to a graph. The opening degree map M may be, for example, a table or a mathematical expression. The opening degree map M may be information in which the engine operating state is associated with the optimum opening degree DA of the nozzle vanes 50.

It is not essential to set the optimum opening degree DA of the nozzle vanes 50 for various engine operating states in the opening degree map M. The opening degree map M may be information on the optimum opening degree DA of the nozzle vanes 50 for only one certain engine operating state. Any information that associates the engine operating state with the optimum opening degree DA of the nozzle vanes 50 may be used as the opening degree map M.

The method of determining the first determination value K1 is not limited to the example in the above-described embodiment. The first determination value K1 may be any value as long as it is appropriate for maximizing the gas blow on the air-fuel ratio sensor 19.

The method of determining the second determination value K2 is not limited to the example in the above-described embodiment. The second determination value K2 may be any value as long as it is appropriate for minimizing the variation in gas blow on the air-fuel ratio sensor 19 among the multiple cylinders 12.

The configuration of the internal combustion engine 10 for which the opening degree map is created is not limited to the example in the above-described embodiment. For example, the number of cylinders 12 may be changed. Any internal combustion engine may be employed as long as it includes an engine main body having multiple cylinders, a variable displacement forced-induction device having nozzle vanes, and an air-fuel ratio sensor that detects the air-fuel ratio of exhaust gas. The air-fuel ratio sensor may be located at any position as long as that position is on the exhaust downstream side, which is the downstream side of the turbine wheel of the forced-induction device in the direction in which exhaust gas flows.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for controlling nozzle vanes, the method creating an opening degree map of the nozzle vanes, an internal combustion engine for which the opening degree map is created including an engine main body including cylinders, a variable displacement forced-induction device including nozzle vanes, and an air-fuel ratio sensor that is located on an exhaust downstream side of a turbine wheel of the forced-induction device and detects an air-fuel ratio of an exhaust gas, the method comprises:

a first step of performing, under a specific engine operating state, an imbalance operation in which only an air-fuel ratio of a specific cylinder, which is one of the cylinders, is made different from air-fuel ratios of the other cylinders and combustion is sequentially performed in the cylinders, as many times as the number of the cylinders while changing the specific cylinder;

a second step of obtaining a detection value of the air-fuel ratio sensor during execution of the imbalance operation to create air-fuel ratio data indicating changes in the air-fuel ratio during the imbalance operation for the number of times of execution of the imbalance operation;

a third step of calculating an air-fuel ratio fluctuation amount for each piece of the air-fuel ratio data, the air-fuel ratio fluctuation amount being a difference between a maximum value and a minimum value of the air-fuel ratio in one piece of the air-fuel ratio data; and a fourth step of determining whether a specific condition is met, the specific condition being that a minimum value among the air-fuel ratio fluctuation amounts is greater than or equal to a predetermined first determination value and a difference between the minimum value and a maximum value among the air-fuel ratio fluctuation amounts is less than or equal to a predetermined second determination value, wherein the first step to the fourth step are repeatedly performed while changing an opening degree of the nozzle vanes, and the method further comprises a fifth step of identifying an opening degree of the nozzle vanes that meets the specific condition under the specific engine operating state, and storing, as the opening degree map, the identified opening degree of the nozzle vanes in association with the specific engine operating state, a sixth step of controlling the opening degree of the nozzle vanes according to the opening degree map.

2. The map creating method for the nozzle vanes according to claim 1, wherein the first step to the fourth step are repeatedly performed while reducing the opening degree of the nozzle vanes by a predetermined constant value, and in the fifth step, a largest opening degree among the opening degrees of the nozzle vanes that meet the specific condition is associated with the specific engine operating state and stored as the opening degree map.

3. The map creating method for the nozzle vanes according to claim 1, wherein the method repeatedly performs the first step to the fifth step while changing the specific engine operating state, thereby storing the opening degree map in which the opening degree of the nozzle vanes meeting the specific condition is associated with each specific engine operating state.

* * * * *